US008478709B2

(12) United States Patent
Tang et al.

(10) Patent No.: US 8,478,709 B2
(45) Date of Patent: Jul. 2, 2013

(54) EVALUATION OF CLIENT STATUS FOR LIKELIHOOD OF CHURN

(75) Inventors: Hsiu-Khuern Tang, San Jose, CA (US); Justin S. Dyer, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 610 days.

(21) Appl. No.: 12/719,198

(22) Filed: Mar. 8, 2010

(65) Prior Publication Data

US 2011/0218955 A1 Sep. 8, 2011

(51) Int. Cl.
*G06F 9/44* (2006.01)
*G06N 7/02* (2006.01)
*G06N 7/06* (2006.01)

(52) U.S. Cl.
USPC .......... 706/52

(58) Field of Classification Search
None
See application file for complete search history.

(56) References Cited

U.S. PATENT DOCUMENTS

| | | | | |
|---|---|---|---|---|
| 5,822,410 | A | 10/1998 | McCausland et al. | |
| 6,049,599 | A | 4/2000 | McCausland et al. | |
| 6,839,680 | B1 | 1/2005 | Liu et al. | |
| 7,340,408 | B1 | 3/2008 | Drew et al. | |
| 7,392,221 | B2 | 6/2008 | Nabe et al. | |
| 7,562,058 | B2 | 7/2009 | Pinto et al. | |
| 2003/0101449 | A1 | 5/2003 | Bentolila et al. | |
| 2005/0210056 | A1* | 9/2005 | Pomerantz et al. | 707/101 |
| 2008/0126176 | A1 | 5/2008 | Iguchi | |
| 2011/0191182 | A1* | 8/2011 | Poirier et al. | 705/14.54 |

OTHER PUBLICATIONS

Flinn ("On-The-Job Search With Information Obsolescence", RR# 96-07 Feb. 1996, pp. 41.*

Whitt ("Continuous-Time Markov Chains", citeseerx.ist.psu.edu/viewdoc/download?doi=10.1.1.138.6171.pdf (internet), 2006, pp. 40.*

Hopmann et al. "Applicability of Customer Churn Forecasts in a Non-Contractual Setting" Studies in Classification, Data Analysis, and Knowledge Organization 2005, pp. 330-337.*

Li et al. "Dynamics properties of epidemic spreading on finite size complex networks", Chinese Physics, 2005, pp. 2153-2157.*

Fader et al. "Customer-Base Analysis in a Discrete-Time Noncontractual Setting", 2009, http://w4.stern.nyu.edu/emplibrary/Peter%20Fader.pdf.*

Zainab Jamal, Dissertation, Chapter 2—Customer Fit and Customer Retention at an Internet Recommendation Site, Sep. 25, 2006, pp. 1-56.

Y. Vardi, "Nonparametric Estimation in Renewal Processes", The Annals of Statistics, vol. 10. No. 3, Sep. 1982, pp. 772-785.

E.L. Kaplan et al., "Nonparametric Estimation From Incomplete Observations", Journal of the American Statistical Association, vol. 53, No. 282, Jun. 1958, pp. 457-481.

(Continued)

*Primary Examiner* — Li-Wu Chang

(57) ABSTRACT

System, including method, apparatus, and computer-readable media, for evaluating client status for a likelihood of churn. Client data may be received, with the client data representing events from a set of different event types performed by clients. Parameters of a statistical model that describes client behavior may be estimated using a computer and based on the client data. A churn type of event may be encoded in the statistical model as an absorbing state of a stochastic process, with a time of transition to the absorbing state modeled as being infinite. At least one of the parameters may correspond to the churn type of event. A likelihood of churn may be calculated for a plurality of the clients at one or more time points using the statistical model and its estimated parameters.

20 Claims, 2 Drawing Sheets

OTHER PUBLICATIONS

A.P. Dempster et al., "Maximum Likelihood From Incomplete Data Via the EM Algorithm", Journal of the Royal Statistical Society, vol. 39, No. 1, 1977, pp. 1-38.
Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: "The Collective Intelligence Platform," Online, http://www.baynote.com/technology/platform/2010.
Hottolink Inc.; "Recognize" Online, http://www.hottolink.co.jp/english/reconize.html, 2009.
Andrejko et al.: "User Characteristics Acquisition from Logs with Semantics" 8. Slovak University of Technology in Bratislava.
Hongjun Lu et al: "Extending a Web Browser with Client-Side Mining," Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India , 2008.
Shahabi et al.; "Yoda an Accurate and Scalable Web based Recommendation System?" University of Southern California, Los Angeles, Sep. 2001.
Why Wubat? Website User Behavior & Analysis Tool, Wubat, Online, http://www.wubat.com/.
Claypool et al.; "Implicit Interest Indicators", 14. Worcester Polytechnic Institute, Worcester, Computer Science Department Worcester Polytechnic Institute Worcester, MA 01609, USA., 2001.
Shahabi et al.; "A Framework for Efficient and Anonymous Web Usage Mining Based on Client-Side Tracking", 15. University of Southern California, Los Angeles, 2002.
Chattertrap; Online http://www.chattertrap.com; Jul. 20, 2010.
HSNW: SRI defense technology spawns civilian application: published Jun. 29, 2010.
Anthony Ha: Facebook investor backs Chattertrap, a personal assistant for content, Jun. 28, 2010.

* cited by examiner

EVALUATION OF CLIENT STATUS FOR LIKELIHOOD OF CHURN

BACKGROUND

Computers are being exploited increasingly to enable commerce between firms (e.g., businesses) and their clients. For example, many client transactions are performed via communication with one or more websites of a firm. In any event, since clients often are identified uniquely in computer-logged activities, client transactions with a firm can be stored as data for analysis. The activities of individual clients can be mined to provide information about client behavior.

Clients can engage in commerce with a firm in a contractual or non-contractual setting. In a contractual setting, the firm may provide goods/services under an agreement that is maintained and/or renewed explicitly or implicitly over time and that is terminated expressly. For example, the firm may provide cable television service to clients via a monthly contract that can be terminated by each client at the end of any month. As another example, the firm may be a bank that provides banking services to account holders that entrust the bank with their money and that remain clients as long as some of the money remains with the bank. Accordingly, commerce performed in a contractual setting allows a firm to observe when clients become permanently inactive, which is referred to as client "churning." Thus, a firm in a contractual setting can identify its active client base with accuracy. In contrast, in a non-contractual setting, a firm may provide goods/services on demand, without any agreement about whether or not a client will remain active with the firm.

Distinguishing active clients from inactive ones in a non-contractual setting can be problematic. Clients that are still active, but have not exhibited recent activity, cannot be distinguished unambiguously from those that have churned. Thus, in a non-contractual setting, clients often are deemed as active or inactive based on an approach using an arbitrary measure of activity, such as whether or not a client has performed a transaction with the firm within a given period of time, such as within the past year. However, this approach is inaccurate and reactive, instead of proactive.

DETAILED DESCRIPTION

Figure 1:
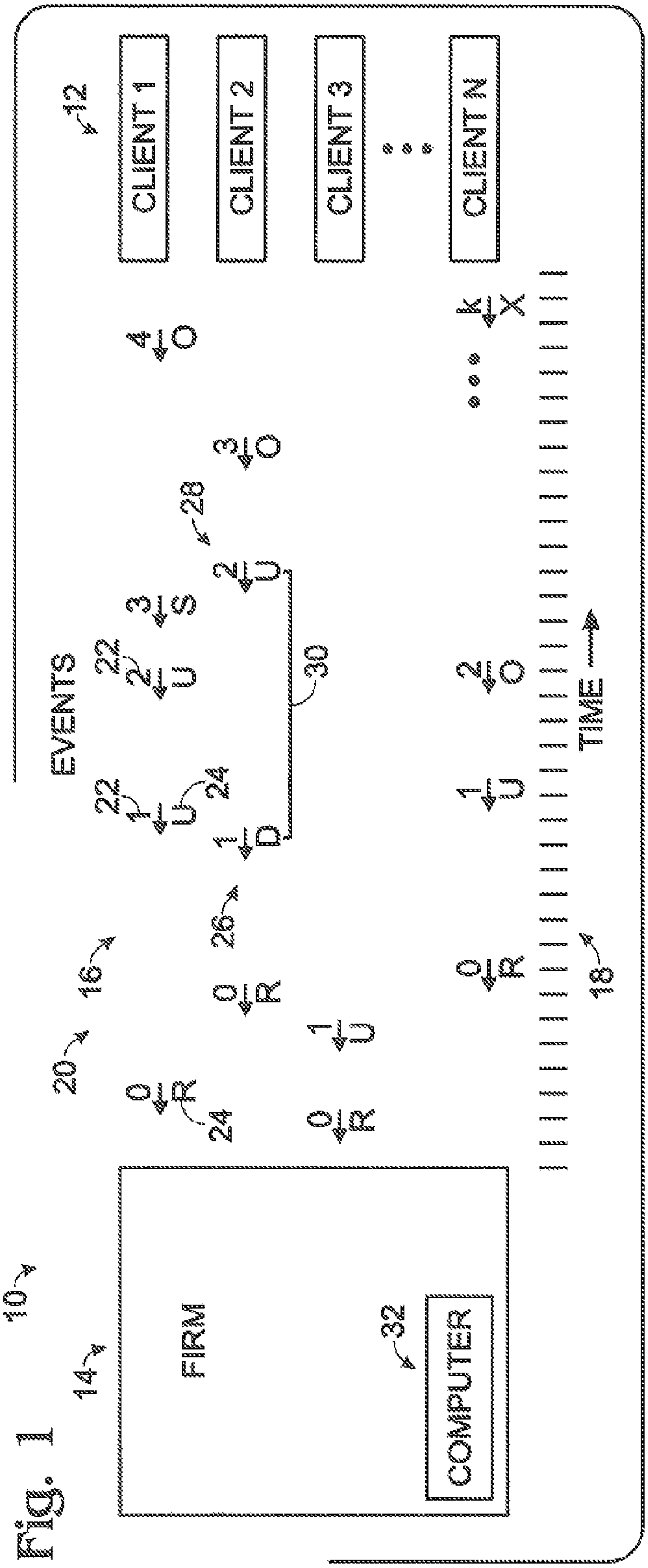
FIG. 1 is a schematic view of an example system for evaluating client status for likelihood of churn in a non-contractual setting, with client events for each client presented in sequence and in relation to time of occurrence, and identified according to sequence position and event type, in accordance with an embodiment of the invention.

The present disclosure provides a system, including method, apparatus, and computer-readable media, for evaluating client status for likelihood of churn, optionally in a non-contractual setting with a firm. The system disclosed herein may treat individual churn occurrences as missing data. The likelihood of the observed attributes of client data may be obtained by averaging out the likelihood of the full client data (observed and missing) over the missing part. Individual probabilities of churn can be estimated by maximizing this likelihood.

A method of evaluating client status is provided. Client data may be received. The client data may represent events (i.e., actions) from a set of different event types (i.e., types of actions) performed by clients, optionally in a non-contractual setting with a firm. Examples of different event types include registering, ordering products, uploading files, downloading files, sharing files, and the like. Each of the event types may be modeled as a distinct state that can be entered by a client in a stochastic process. Also, the elapsed time between a pair of consecutive events for a client may be characterized as a transition time between consecutive states of the stochastic process.

Client churn also may be modeled as a type of event, namely, a "churn type of event" that can be performed by clients. The performance of a churn type of event places a client in a permanently inactive condition. The churn type of event (like the different event types represented by the client data) can be modeled as a distinct state that can be entered by a client following a stochastic process. However, the churn type of event (unlike the different event types represented by the client data) is not observable in the client data in a non-contractual setting.

Parameters of a statistical model that describes client behavior may be estimated using a computer and based on the client data. A churn type of event may be encoded in the statistical model. The churn type of event may be encoded explicitly. The churn type of event may be encoded as an absorbing state of a stochastic process. An absorbing state is any state which, once entered, cannot be exited. In other words, occurrence of the churn type of event for a client terminates the stochastic process. A time of transition to the absorbing state from any other state (i.e., from any other event type) may be modeled as being infinite. Thus, in the model, it may take infinitely long to transition from any other event type to the churn type of event. At least one of the parameters of the statistical model may correspond to the churn type of event. A likelihood of churn (i.e., the probability that the churn type of event has occurred) may be calculated for each of a plurality of the clients at one or more time points using the statistical model and its estimated parameters.

An article comprising at least one computer readable storage medium may be provided. The medium may contain instructions executable by a computer to perform the method of evaluating client status disclosed in the preceding paragraph. In some cases, the statistical model may be based on an assumption that the events for each client form a sequence of event types that follows a Markov chain. In some cases, the statistical model may be based on an assumption that a probability distribution of a time interval (i.e., the transition time) between a given pair of consecutive events is dependent on the event type for a temporally first member of the given pair of consecutive events.

An apparatus may be provided for evaluating client status. The apparatus may include memory for storing client data that is received. The client data may represent events from a set of different event types performed by clients in a non-contractual setting. The apparatus also may include a parameter estimation routine that estimates parameters of a statistical model that describes client behavior based on the stored client data. A churn type of event may be encoded in the statistical model as an absorbing state of a stochastic process, with a time of transition to the absorbing state conceptualized as being infinite. At least one of the parameters may correspond to the churn type of event. The apparatus further may include a likelihood calculator that calculates a likelihood of churn for a plurality of the clients at one or more time points using the statistical model and its estimated parameters.

A survival model is disclosed for client data with multiple recurrent events of several interrelated types, such as might arise from client transactions on a website. The model may (or may not) be based on a Markov chain that drives several renewal-like processes. A computationally tractable expectation-maximization (EM) algorithm may be developed for fitting the model to observed data. Through this model, quantities may be estimated related to an absorbing, or "churn" state that is never actually observed in the data.

The system disclosed herein may permit a firm to more accurately assess which of its clients are active ("alive") and which are inactive ("dead" or "churned"). The clients that are active may still be using the firm's products and/or services and thus have potential future value to the firm. In contrast, churned clients interacted with the firm in the past but may have chosen to use the goods and/or services of a competitor of the firm, or may have left the industry altogether, among others. In some cases, a churned client may bring negative value to the firm through negative comments or flagging the firm's communications as spam. In any event, by assessing the status of its clients, the firm may work more effectively to improve client retention. The ability to retain a client adds tremendous value to the firm. For example, reducing churn rate by one percent may add, on average, about five percent to the firm's value. The ability to predict the likelihood that a client has already churned (current status) and also predict the client's status in any given time window into the future (future status) may be of tremendous value to the firm as it enables the firm to implement retention and loyalty strategies that are proactive instead of reactive. Furthermore, estimating weights of different client attributes as drivers of client churn may provide additional insights into which attributes are the key drivers of client experience and which of the firm's processes and systems need to be improved to ensure an enhanced client experience.

FIG. 1 shows a system 10 for evaluating client status for likelihood of churn by clients 12 in a non-contractual setting with a firm 14. Client events 16 created as activities performed with firm 14 are represented with respect to time 18, to provide client data 20. Events 16 are illustrated schematically in FIG. 1 as event arrows.

The events for a given client form an event sequence, based on the order in which the events occurred. For example, in FIG. 1, each event for a client may have an event number 22 according to the order of event occurrence in the client's event sequence. The event numbers for a client's sequence of events may start at zero, which may represent registration of the client with the firm. (Registration is labeled as "R" under the first event arrow in each client's event sequence.) A client may participate in any number of events 16 after registration over a total observation period, such as zero (registration only), one (e.g., Client 3), two, three (e.g., Client 2), four (e.g., Client 1), or more (e.g., Client N). The events for each client may occur independently in time from events of other clients.

Each event may have an associated event type 24, which describes and/or corresponds to the nature of the activity performed to produce the event. Event type 24 may be selected from a set of event types available to the client, in the present example, for the purposes of illustration only, the event types represent a sample of event types available to clients that interact with a firm providing a web-based photograph sharing and printing service, such as the service called Snapfish®. Each event is labeled below its event arrow in FIG. 1 with a corresponding event type ("R" (registration), "U" (upload), "S" (save), "O" (order), or "X" (to represent any of the event types)). However, churn events generally are not observable in the client data because there is no communication of a client's decision to churn in a non-contractual setting, in other words, any of the clients in FIG. 1 may have churned before the end of the observation period, but the probability of churn may be different for each client, based the observed behavior for each client. For example, Client 3 may have a higher likelihood of having churned because this client exhibited no event, activity for most of the observation period.

Each pair of consecutive events 26, 28 for a particular client 12 may be separated by a time interval 30. The time intervals for pairs of consecutive events within a sequence for the particular client may be assumed to be independent from one another. Also, the time interval for a given pair of consecutive events for the client may be assumed to result from a probability distribution of event occurrence. The probability distribution may be dependent on the event type for a temporally first member 26 (i.e., the preceding event) of the pair or may be dependent on the event types for both first and second members 26, 28 (i.e., the preceding event and the following event, respectively) of the pair.

Firm 14 may include at least one computer 32 (or a computer network) that receives, logs, and/or stores data about client events 16, such as the time (e.g., the date and/or time of day) when each event occurred, the type of each event, a time interval between consecutive events of a client, and the like. Computer 32 also may calculate, store, and/or receive data regarding client-specific attributes.

A client "event," as used herein, is any type of activity or session, such as a transaction and/or interaction, involving both a client 12 and firm 14. An event also may be termed an "event session." The events available to a client may be determined by the type of business conducted by the firm. For example, the firm may conduct business over a computer network (e.g., the Internet), such as via one or more websites. Examples of types of client events that may be executed over a computer network include registration, a visit (e.g., to a firm website), a download of one or more files, an upload of one or more files, an order and/or purchase of one or more goods and/or services, file viewing, sharing a file(s) (e.g., with another client), or the like. Examples of types of client events that may be executed by a client physically present at the firm include registration, a purchase of one or more goods/services, a visit, a consultation, a trade, a return of one or more purchased goods/services, or the like.

A "non-contractual setting," as used herein, is any business arrangement between a firm and clients in which each client can become inactive at any selected time without notifying the firm and thus without observation by the firm. The term "churn" is used herein to denote silent attrition, namely, the unobservable event of a client becoming inactive. A client may churn with or without making a conscious decision to terminate activity with a firm. In a non-contractual setting, a firm cannot know with certainty whether any given client who has not created an event for an extended period of time has actually churned or is just taking a long hiatus from performing transactions with the firm.

A "firm," as used herein, is any person or organized group of people that offers goods and/or services to clients, generally for commercial purposes.

A "client," as used herein, is any person or organized group of people that performs activities, such as transactions and/or interactions, to create recordable events with a firm, generally for commercial purposes.

A client "attribute," as used herein, is any characteristic of clients. An attribute for a particular client may be constant or may vary with respect to time and/or client event number. Example attributes have values and/or may be assigned values for each client, and may include total number of events, average time interval between events, total money spent, a time interval elapsed since the client's most recent event, number of a particular type of event taken, age, gender, income, occupation, etc. If the attribute varies over time, a value for the attribute for an individual client may be determined, such as a value determined after an event has been completed by the client. An attribute also may be termed a "covariate."

The client data of FIG. 1 is longitudinal data that consist of recurring events of a set of clients. The present disclosure provides method, apparatus, and computer-readable media to estimate the distribution of the recurrence times of those events. For example, a firm may have data about its clients' transactions on the firm's website over a period of time, and would like to understand the typical time between two transactions and the rate at which clients "churn" (leave for good). A common feature in such data is the presence of censored intervals from the clients' last observed events to the end of the observation period.

Each client may perform one or more activities with a firm, to create recorded events. Examples of activities include registering at the firm's website and purchasing something from the firm. These activities may be recorded by the firm together with a set of attributes that can be used to predict churn, such as the time of the activity and the amount spent in a purchase. The approach presented herein may utilize the framework of the survival analysis of recurrent events. In standard survival analysis, the time interval since the last observed activity is censored because the next activity has not occurred by the time of data collection. The censored interval can arise either because the next activity has not occurred, or because the client has churned.

Client data may be modeled by assuming that each event belongs to a discrete observed type, that the progression of event types of a client may (or may not) follow a Markov chain, and that the transition times (time intervals between distinct pairs of consecutive events) may be conditionally independent given the Markov chain with marginal distributions $F_{i,j}$ depending only on the types i and j involved in that particular transition. Each censored interval may be from an observed type to an unobserved type; the unobserved types may be treated as missing data and an expectation-maximization (EM) algorithm may be used to find the maximum-likelihood estimators (MLEs) of the Markov transition probabilities $\pi_{i,j}$ and of $F_{i,j}$. The formulation disclosed herein may be well-suited to problems where the distinct event types, such as client registration, ordering, searching, and churn, are interesting to a firm and are more than just potential covariates.

The following assumptions may be introduced. (1) Each client may perform activities to provide events at increasing times $t_1, \ldots, t_J$ (these times may be different for different clients). (2) A set of attributes of each client may be observed at the time of each event, such as X(t) at time t. (3) After each event at $t_j$, the client may have a probability $t_j$ of churning, which could depend on the values X(t) for t up to $t_j$. If the client does not churn, the distribution of the time until the next event may be characterized by a hazard rate function that depends on $X(t_j)$. (4) The clients may be stochastically independent, so that the likelihood of the data is the product of the likelihoods for each client.

For illustration, a simple model is described here for $p_j$ with a small number of parameters, but the approach disclosed herein may be applied whenever the churn process and the hazard rate can be jointly estimated. Suppose that activities can be of various types, say 1 through k, and that each client has a probability p(w)=1−q(w) of churning after an activity of type w. Following the approach of survival analysis, the likelihood contribution from each client can be written as the product of J factors arising from the uncensored intervals $d_j=t_{(j+1)}-t_j$ and a factor arising from the censored interval y (=time since $t_J$). If the generic notation f and F to denote densities and distribution functions, respectively, then the likelihood contribution may be $$q(w_1)f(d_1)\ldots\times q(w_{J-1})f(d_{J-1})\times\{p(w_J)+q(w_J)[1-F(y)]\}$$

This likelihood is similar to the "standard form" that occurs in survival analysis of recurrent events, but with a substantial difference: the last factor (in braces), which comes about by conditioning on whether the client has churned (with probability $p(w_J)$) or not, is a linear combination involving both F and $p(w_J)$. The linear combination may make it difficult to compute the maximum likelihood estimates of the model parameters (even numerically), and standard methods such as the Cox model cannot be applied directly.

However, the problem may be re-cast to one that has an efficient numerical solution. The notation may be eased by letting churn correspond to performing a "next" activity of type zero at t=∞. Thus, for each client, $w_{J+1}$ may be the unobserved next activity, which has type zero (and then $t_{J+1}=\infty$) if and only if the client churns after the last observed event. The term $w_{J+1}$ may be treated as missing data, and the E-M algorithm may be applied to obtain the maximum likelihood estimates for the model, This E-M algorithm is an iterative algorithm that may be suitable when the conditional expectation of the full-data log-likelihood given the non missing data can be written down and maximized (at least numerically). The full-data likelihood may have the form $$q(w_1)f(d_1)\ldots\times q(w_{J-1})f(d_{J-1})\times p(w_J)^{\gamma}\{q(w_J)[1-F(y)]\}^{1-\gamma}$$

where γ is the chum indicator (i.e., $\gamma=1\{w_{J+1}=0\}$). The conditional expectation to maximized may be obtained by finding the probability of churn given the data, which has a closed form that may be derived readily from the above full-data likelihood. After simplification, it turns out that this is separable in the churn parameters $p(w_J)$ and the parameters of the distribution functions F, so that the maximization can be done separately. The maximization over p(w) may be solved using calculus, and the maximization over F may be amenable to standard survival analysis techniques like the Cox model.

Figure 2:
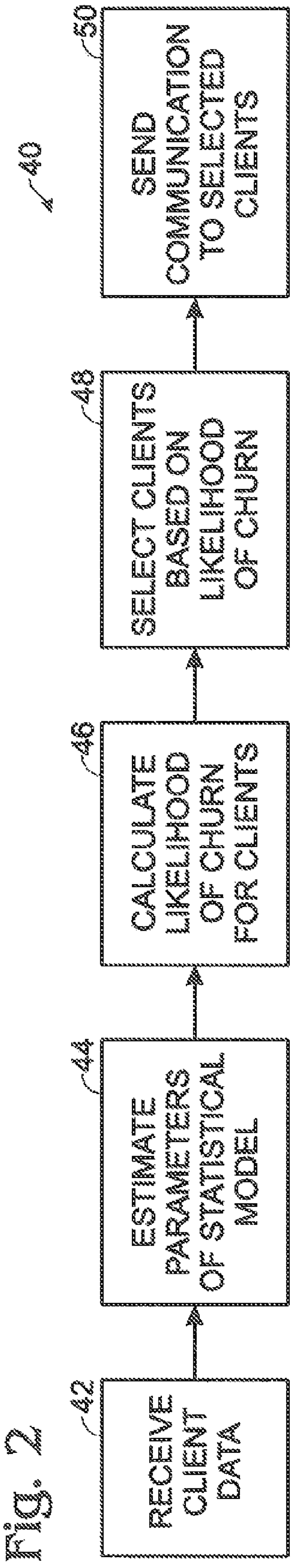
FIG. 2 is a flowchart illustrating steps that may be performed by the example system of FIG. 1 in an example method of evaluating client status for likelihood of churn in a non-contractual setting, in accordance with an embodiment of the invention.

FIG. 2 shows a flowchart 40 illustrating steps that may be performed by system 10 of FIG. 1 in an example method of evaluating client status for likelihood of churn in a non-contractual setting. The steps listed in FIG. 2 may be performed in any suitable order and in any suitable combination, and may be combined with any other steps disclosed elsewhere herein.

Client data 20 may be received, indicated at 42. The client data may represent a plurality of events created by client activities with respect to a firm in a non-contractual setting. The events for each client may be associated with a unique client identifier, may be numbered sequentially, and time intervals between consecutive events for the client may be determined. The client data may be a data sample prepared from a larger collection of client data by selecting a sample of clients (e.g., a random sample, such as 0.01%) and the events data associated with each client in the sample.

Each event for a client may be assigned an event number and an event type. The event number may be an ordinal number that describes the relative temporal position of a particular client event relative to the entire sequence of events created by the client. For example, the initial event for each client may be registration and may be assigned the number zero. Subsequent events by the same client may be numbered, respectively, as 1, 2, 3, and so on. Also, a time interval between each pair of consecutive events for a client may be determined. After processing, a client data table may list, for each pair of consecutive actions, any combination of the following: client identification number, from-event type (e.g., registration), from-event date/time, to-event type (e.g., upload), to-event date/time, time interval between from-event and to-event, values of attributes for the client on or at the from-action (or to-action) date/time, and so on.

Parameters of a statistical model may be estimated from the client data, indicated at 44. A churn type of event may be encoded explicitly in the statistical model and at least one of the parameters may correspond to the churn type of event. The churn type of event may be modeled as an absorbing state of a stochastic process such that a time of transition from the absorbing state is modeled as being at least substantially infinite. The statistical model may be based on an assumption that the events for a particular client form a sequence of event types that follows a Markov chain. The sequence of event types for each client may be assumed to be time-homogeneous or time-inhomogeneous. In some examples, estimation of one or more parameters associated with predicting a sequence of events for each client may be uncoupled from an estimation of one or more parameters associated with predicting time intervals between events for each client. In some examples, estimating one or more parameters associated with predicting a sequence of events for each client and estimating one or more parameters associated with predicting time intervals between events, may be performed separately and iteratively. Further aspects of the statistical model are described elsewhere in the present disclosure.

A likelihood of churn may be calculated, indicated at 46. The likelihood may be calculated at one or more time points for each client with a computer using the statistical model and its parameters.

One or more clients may be selected based on the likelihood of churn calculated, indicated at 48. Each client may be selected if the client's likelihood of churn meets a predefined condition. For example, the predefined condition may provide selection of clients with a likelihood of churn that is less than a threshold value, so that these clients, who have a lower risk of having, churned, are targeted, while clients with a higher risk of having churned are excluded. Alternatively, the predefined condition may provide selection of clients who have a likelihood of churn that is greater than a threshold value, so that the clients most likely to have churned are targeted. In some embodiments, clients may be selected if their likelihood of churn falls within a predefined range of values. In this case, clients most likely to remain active with the firm (and thus needing no encouragement) and those mostly likely to have churned may be excluded.

A communication may be sent to the selected clients, indicated at 50. The communication may take any suitable form and may be transmitted by any suitable mechanism. Example communications include an e-mail message, a website message, and a pre-printed document. Accordingly, the communication may be sent electronically or may be mailed as a hard-copy document. In some embodiments, the communication may be an advertisement, a coupon, a catalog, or any combination thereof.

Figure 3:
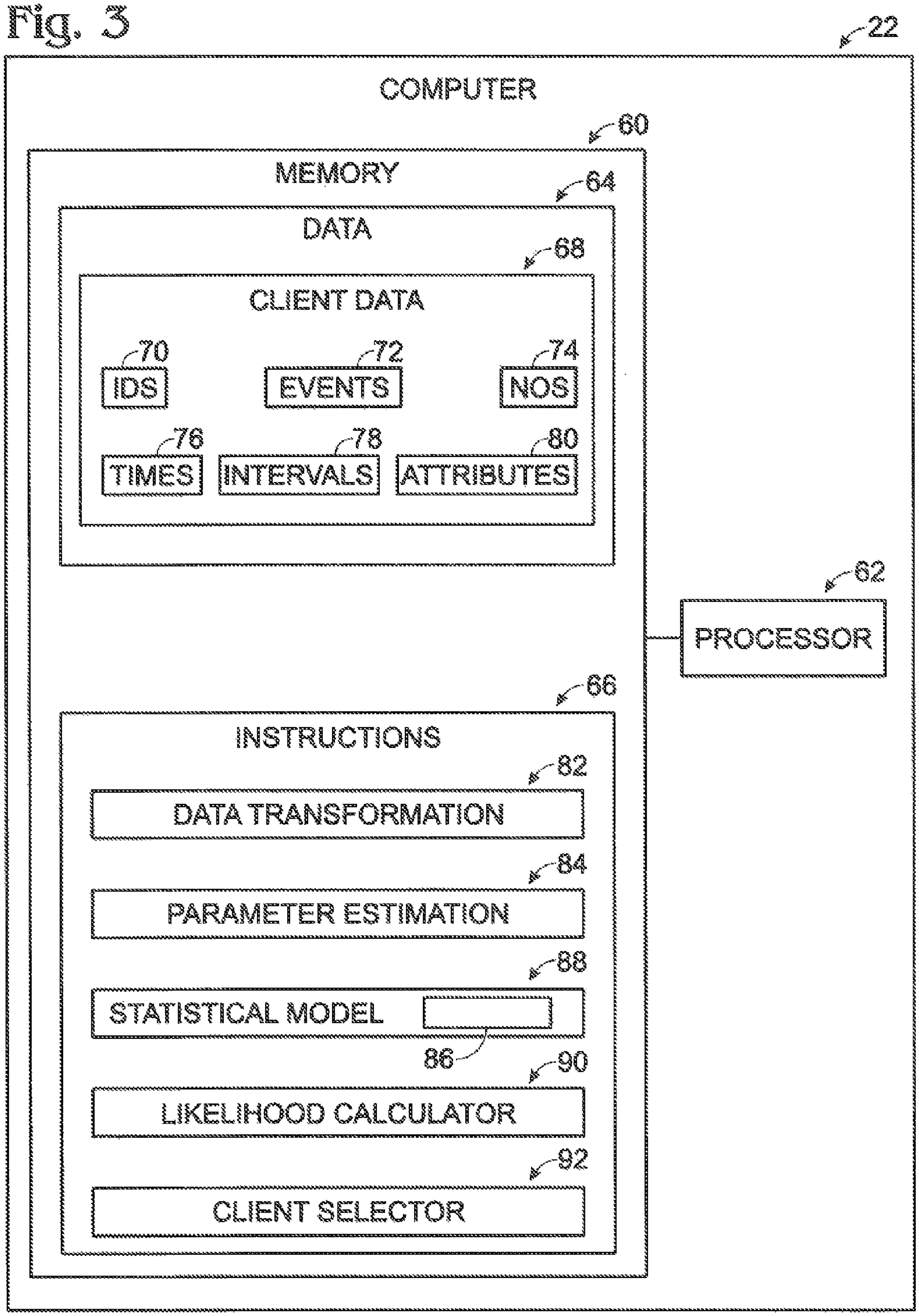
FIG. 3 is a schematic view of selected aspects of an example computer present in the system of FIG. 1 and configured to perform the method of FIG. 2, in accordance with an embodiment of the invention.

FIG. 3 shows selected aspects of computer 32 of FIG. 1. The computer may include at least one computer readable storage medium, such as memory 60, and a processor 62 operatively connected to memory 60. The storage medium may carry data 64 and instructions 66 for operating on the data.

Data 64 may include client data 68. The client data may include client identifications 70 that uniquely identify each client and which permit all client-specific data for each particular client to be linked. For example, each client identification may be linked to one or more events 72, events numbers 74, times 76 when the events occurred, time intervals 78 between consecutive events, and values of one or more attributes 80 for the client.

Instructions 66 may include any algorithms to operate on data 64 or derivatives thereof. The instructions may include a data transformation routine 82 that prepares client data, such as by determining time intervals, values of client attributes, and the like. Instructions 66 also may include a parameter estimation routine 84. The estimation routine may be configured to utilize client data 68 to estimate parameters 86 of a statistical model 88 to explain the client data. The instructions further may comprise a likelihood calculator 90 that calculates the likelihood of churn at different times for particular clients using the statistical model and its parameters. Furthermore, instructions 66 may be equipped with a client selector 92 that selects clients based on a calculated likelihood of churn for individual clients.

Further aspects of a basic statistical model are presented here. The following general process may be assumed. There may be a set of clients, each of which moves independently through a sequence of (observed) states. That is, any particular client may move through the states $W_1, W_2, \ldots$. The time between states $W_k$ and $W_{k+1}$ is $X_k$. It may be assumed that $\{W_n\}$ is a finite-state Markov chain and that the conditional distribution of $X_k$ given $\{W_n\}$ and $\{X_n;\ 1 \leqq n<k\}$ depends on the delimiting states $W_k$ and $W_{k+1}$ only. The probability of transitioning from state i to state j in the Markov chain is denoted by $\pi_{i,j}$. Hence, the process may be characterized by the transition probabilities $$\pi_{i,j}=P(W_{k+1}=j|W_k=i)$$

and the distribution functions $$F_{i,j}(x)=P(X_k \leqq x|W_k=i, W_{k+1}=j).$$

It may be assumed that the corresponding densities $f_{i,j}$ exist (with respect to some measure). There may be N independent clients, all following the same process. Each client may be observed from his initial state $W_1$ until a fixed time t, which can be different for different clients. The terms $\pi$ and $F_{i,j}$ may be estimated.

For simplicity of presentation and analysis, in what follows a discrete-time setting may be assumed, in which all event times may be nonnegative integers, and there may be a fixed time t common to all clients. However, the extensions to the more general cases may be implemented readily.

For each client, the data may include transition states and times up to t as well as a (possible) censored time interval corresponding to the time since the last event up until t. If the number of observed states (in [0, t]) is ν and the length of the censored interval is $$y = t - \sum_{i=1}^{v-1} X_i$$

(which may possibly be zero), the likelihood of the data ν, ($W_n$; n=1, . . . , ν), and ($X_n$; n=1, . . . , ν−1) for a single client is $$\left(\prod_{i=1}^{v-1} \pi_{W_i,W_{i+1}} f_{W_i,W_{i+1}}(X_i)\right) \sum_{w} \pi_{W_v,w}(1 - F_{W_v,w}(y)),$$

where $f_{w,w'}(\tau)$ is the density (with respect to counting measure) associated with state pair (w,w') and state-transition duration $1 \leqq \tau \leqq t$; $F_{w,w'}(\tau)$ is the associated distribution function.

For a primary application of interest, it may be assumed that there exists a special churn state, denoted by ∞, corresponding to an absorbing state of the Markov chain. The transition to this churn state may occur with some probability $\pi_{w,\infty}$ which may depend on the last observed state of the chain. The transition to this state, since it may never be observed in the data, can be viewed as occurring in "infinite time," i.e., $F_{w,\infty}(\tau)=0$ for all $w \neq \infty$ and every $\tau \in N$.

As an example, consider the clients of a web service in a non-contractual setting. Clients may join and leave the service at any time and, in particular, clients may leave the service without any notification or interaction with the website of the service. The event of leaving the service permanently can be viewed as transitioning into an absorbing state of the Markov chain; however, since no interaction with the website is necessary, this event may never be observed and so the transition may take infinite time to occur.

By defining $g_{w,w'}(\tau)=\pi_{w,w'}f_{w,w'}(\tau)$ and $G_{w,w'}(\tau)=\pi_{w,w'}F_{w,w'}(\tau)$, the likelihood can be rewritten in Expression 1 as $$\left(\prod_{i=1}^{v-1} g_{W_i,W_{i+1}}(X_i)\right)\left(1 - \sum_{w} G_{W_v,w}(y)\right).$$

Note that the sum in the likelihood can, equivalently, be taken only over the states $w \neq \infty$.

Since clients may be assumed to be independent, the likelihood may be written for a set of K clients. By counting the number of observed transitions from w to w' that take time τ across all clients, as well as the number of censored events of length τ starting at state w, the log-likelihood across all K clients can be written in Expression 2 as $$\sum_{w}\left(\sum_{w'}\sum_{j=1}^{t} x_{w,w',j}\log g_{w,w'}(j) + \sum_{j=1}^{t} z_{w,j}\left(1 - \sum_{w'} G_{w,w'}(j)\right)\right),$$

where $x_{w,w',j}$ is the number of observed transitions from w to w' that took j units of time enumerated across all clients, while $z_{w,j}$ is the number of censored intervals of length j, starting at state w. Thus, $$\tau_w \Sigma_j z_{w,j} \in \{0, 1, \ldots, K\},$$

since for each client there may only be zero or one censored event.

In the case where $g_{w,w'}$ and $G_{w,w'}$ are functionally independent with respect to w, and hence, Expression 2 is separable, each term in the outer sum can be maximized independently when computing a maximum likelihood estimate (MLE).

A general expectation-maximization (EM) algorithm is provided that may allow decomposition of the likelihood so that the transition time distributions $F_{i,j}$ may be estimated separately for each (i,j) pair. A general EM algorithm may be derived for maximizing Expression 2. Since clients may be independent, a single client may be considered first. The case of $W=W_{v+1}$ may be treated as missing data and the EM algorithm may be applied. The variable η may denote the collection of π and $F_{i,j}$ that characterizes the data-generation process.

In the E-step (expectation step), the following (Expression 3) may be computed:

$$Q(\eta'|\eta)=E_\eta[\text{loglik}(\eta';\text{data},W)|\text{data}];$$

in the M-step (maximization step), η' may be chosen to maximize Q(η'|η).

In Expression 3, the loglik(_) term is the logarithm of $$\pi_{W_1,W_2} f_{W_1,W_2}(X_1) \times \pi_{W_2,W_3} f_{W_2,W_3}(X_2) \ldots \times \pi_{W_{v-1},W_v} f_{W_{v-1},W_v}(X_{v-1}) \times \pi_{W_v,W}[1 - F_{W_v,W}(y)],$$

and the conditional expectation may be computed using Expression 4:

$$c(j) := P_\eta(W=j|\text{data}) \propto \pi_{W_v,j}[1-F_{W_v,j}(y)].$$

Therefore, the following results (Expression 5):

$$\exp\{Q(\eta' \mid \eta)\} = \pi_{W_1,W_2} f_{W_1,W_2}(X_1) \times \pi_{W_2,W_3} f_{W_2,W_3}(X_2) \ldots \times \pi_{W_{v-1},W_v} f_{W_v}(X_{v-1}) \times \prod_j \pi_{W_v,j}^{c(j)}[1 - F_{W_v,j}(y)]^{c(j)}$$

When all N clients are considered, the right-hand-side of Expression 5 may involve an additional product over all the clients. In the M-step, the c(j) may be fixed: they may computed using the current estimate η. In the above form, when maximizing Q(η'|η) over η', π and each $F_{i,j}$ may be chosen independently. The function $F_{i,j}$ may maximize a product of the form (Expression 6)

$$\prod_{l}[1 - F_{i,j}(y_{0,l})]^{c_{0,l}} \times [f_{i,j}(\tau_1)]^{\delta_1} \prod_{l}[1 - F_{i,j}(y_{1,l})]^{c_{1,l}} \times [f_{i,j}(\tau_2)]^{\delta_2} \prod_{l}[1 - F_{i,j}(y_{2,l})]^{c_{2,l}} \ldots \times [f_{i,j}(\tau_K)]^{\delta_K} \prod_{l}[1 - F_{i,j}(y_{K,l})]^{c_{K,l}},$$

where $\tau_1<\tau_2< \ldots <\tau_K$ may be the distinct values of the transition times from i to j among the N clients, $\delta_k$ may be the number of transition times equal to $\tau_k$, and, for each k, $y_{k,l}$ may be the values of the censored interval lengths that lie in ($\tau_k$, $\tau_{k+1}$) ($\tau_0$=0 and $\tau_{K+1}$:=∞)), among those clients whose last observed state was i. Each constant $c_{k,l}$ may the conditional probability of transitioning to state j given the data for the client involved, and may be calculated as in Expression 4.

It may be assumed that the MLE of $F_{i,j}$ is given and consider the problem of finding the MLE of π. From Expression 5, the following may be maximized $$\prod_{i,j} (\pi_{i,j})^{n(i,j)},$$

where n(i,j) is the number of observed transitions from i to j, plus the sum of weights c(j) over all clients whose last observed state is i. The maximum may be attained at Expression 7:

$$\hat{\pi}_{i,j} = n(i, j) \Big/ \sum_{\tilde{j}} n(i, \tilde{j}).$$

An example EM algorithm proceeds as follows. (1) To provide initialization, for each client, an initial value may be used for the conditional distribution c(j) of the unobserved state $W=W_{v+1}$ given the data, such as a uniform distribution over all possible end states. (2). The variable $\pi$ may be estimated using the estimate of Expression 7. (3) The distribution $F_{i,j}$ may be updated using, for example, a maximum likelihood estimate. (4) The process may be stopped if $\pi$ and $F_{i,j}$ have not changed substantially; otherwise the conditional probabilities c(j) may be updated using Expression 4 and then the process may return to step 2 of this paragraph.

Other initialization schemes may be utilized instead, such as first estimating $\pi$ from the observed transitions only and then using $c(j)=\pi w_{v,j}$ as the initial distribution for W. The choice of the scheme may be relatively unimportant, although it may be advantageous to be wary of getting stuck at a particular parameter value because of a structural assumption like an absorbing state. Some initializations may lead to MLEs over restricted parameter spaces.

We claim:

1. A method of evaluating client status, comprising:

receiving client data representing events from a set of different event types performed by clients, wherein the clients are in a non-contractual setting with a firm offering products or services to the clients;

estimating, using a computer and based on the client data, parameters of a statistical model that describes client behavior, wherein a churn type of event is encoded in the statistical model as an absorbing state of a stochastic process, with a time of transition to the absorbing state modeled as being infinite, wherein the churn type of event is not observable in the client data, and performance of the churn type of event places the clients in a permanently inactive condition with the firm, and wherein at least one of the parameters corresponds to the churn type of event;

calculating a likelihood of churn for a plurality of the clients at one or more time points using the statistical model and its estimated parameters; and selecting a client for which the likelihood of churn meets a predefined condition, the client selected to remain active with the firm.

2. The method of claim 1, wherein estimating includes basing the statistical model on an assumption that the events for each client form a sequence of event types that follows a Markov chain.

3. The method of claim 2, wherein basing includes making an assumption that the sequence of event types is time-homogeneous.

4. The method of claim 1, wherein estimating includes basing the statistical model on an assumption that a probability distribution of a time interval between a given pair of consecutive events is dependent on the event type for a temporally first member of the given pair of consecutive events.

5. The method of claim 1, wherein estimating includes basing the statistical model on an assumption that a probability distribution of a time interval between a given pair of consecutive events is dependent on the event type for both members of the given pair of consecutive events.

6. The method of claim 1, wherein estimating includes decoupling an estimation of one or more parameters associated with predicting a sequence of events for each client from an estimation of one or more parameters associated with predicting time intervals between events for each client.

7. The method of claim 6, wherein estimating includes (a) estimating one or more parameters associated with predicting the sequence of events for each client and (b) estimating one or more parameters associated with predicting time intervals between events, and wherein (a) and (b) are performed separately and iteratively.

8. The method of claim 1, wherein the likelihood of churn for the plurality of the clients is based on a combination of churn probability and distribution of uncensored intervals.

9. An article comprising at least one computer readable storage medium containing instructions executable by a computer to perform a method of evaluating client status, the method comprising:

receiving client data representing events from a set of different event types performed by clients in a non-contractual setting with a firm offering products or services to the clients;

estimating, using a computer and based on the client data, parameters of a statistical model that describes client behavior, the statistical model being based on an assumption that the events for each client form a sequence of event types that follows a Markov chain, wherein a churn type of event is encoded in the statistical model as an absorbing state of a stochastic process, with a time of transition to the absorbing state modeled as being infinite, and wherein the churn type of event is not observable in client data, and performance of the churn type of event places the clients in a permanently inactive condition with the firm, and wherein at least one of the parameters corresponds to the churn type of event;

calculating a likelihood of churn for a plurality of the clients at one or more time points using the statistical model and its estimated parameters; and selecting a client for which the likelihood meets a predefined condition to remain active with the firm.

10. The article of claim 9, wherein estimating includes making an assumption that the sequence of event types is time-homogeneous.

11. The article of claim 9, wherein estimating includes basing the statistical model on an assumption that a probability distribution of a time interval between a given pair of consecutive events is dependent on the event type for a temporally first member of the given pair of consecutive events.

12. The article of claim 9, wherein estimating includes basing the statistical model on an assumption that a probability distribution of a time interval between a given pair of consecutive events is dependent on the event type for both members of the given pair of consecutive events.

13. The article of claim 9, wherein estimating includes decoupling an estimation of one or more parameters associated with predicting a sequence of events for each client from an estimation of one or more parameters associated with predicting time intervals between events for each client.

14. The article of claim 13, wherein estimating includes (a) estimating one or more parameters associated with predicting the sequence of events for each client and (b) estimating one or more parameters associated with predicting time intervals between events, and wherein (a) and (b) are performed separately and iteratively.

15. The article of claim 9, wherein the likelihood of churn for the plurality of the clients is based on a combination of churn probability and distribution of uncensored intervals.

16. An apparatus for evaluating client status, comprising:

a storage medium to receive client data representing events from a set of different event types performed by clients in a non-contractual setting with a firm offering products or services to the clients;

a non-transitory computer-readable storage medium storing program code executable by a processor, the program code defining:

a parameter estimation routine that estimates parameters of a statistical model describing client behavior based on the client data, wherein a churn type of event is encoded in the statistical model as an absorbing state of a stochastic process, with a time of transition to the absorbing state modeled as being infinite, wherein at least one of the parameters corresponds to the churn type of event, and wherein the churn type of event is not observable in the client data, and performance of the churn type of event places the clients in a permanently inactive condition with the firm;

a likelihood calculator that calculates a likelihood of churn for a plurality of the clients at one or more time points using the statistical model and its estimated parameters; and a client selector that selects a client for which the likelihood of churn meets a predefined condition, the client selected to remain active with the firm.

17. The apparatus of claim 16, wherein the parameter estimation routine bases the statistical model on an assumption that a probability distribution of a time interval between a given pair of consecutive events is dependent on the event type for at least one member of the given pair of consecutive events.

18. The apparatus of claim 16, wherein the parameter estimation routine decouples an estimation of one or more parameters associated with predicting a sequence of events for each client from an estimation of one or more parameters associated with predicting time intervals between events for each client.

19. The apparatus of claim 16, wherein the parameter estimation routine (a) estimates one or more parameters associated with predicting the sequence of events for each client and (b) estimates one or more parameters associated with predicting time intervals between events, and wherein (a) and (b) are performed separately and iteratively.

20. The apparatus of claim 16, wherein the likelihood of churn for the plurality of the clients is based on a combination of churn probability and distribution of uncensored intervals.

* * * * *